United States Patent
Zein Al-Abedeen et al.

(10) Patent No.: US 7,477,613 B2
(45) Date of Patent: Jan. 13, 2009

(54) METHOD AND SYSTEM FOR BROADCASTING MULTICAST MESSAGES USING REPRESENTATIVES

(75) Inventors: Tarif Zein Al-Abedeen, Castanet (FR); Frédéric Charles, Mesvrés (FR)

(73) Assignee: Alcatel, Paris (FR)

( * ) Notice: Subject to any disclaimer, the term of this patent is extended or adjusted under 35 U.S.C. 154(b) by 947 days.

(21) Appl. No.: 10/415,297

(22) PCT Filed: Nov. 5, 2001

(86) PCT No.: PCT/FR01/03403

§ 371 (c)(1),
(2), (4) Date: Apr. 28, 2003

(87) PCT Pub. No.: WO02/37762

PCT Pub. Date: May 10, 2002

(65) Prior Publication Data

US 2004/0029524 A1    Feb. 12, 2004

(30) Foreign Application Priority Data

Nov. 6, 2000    (FR)    ................................. 00 14164

(51) Int. Cl.
  *H04L 12/28*    (2006.01)
(52) U.S. Cl. ............... 370/254; 370/390; 370/392; 370/401; 709/220
(58) Field of Classification Search .......... None
See application file for complete search history.

(56) References Cited

U.S. PATENT DOCUMENTS

| | | | | |
|---|---|---|---|---|
| 5,905,871 A | * | 5/1999 | Buskens et al. | 709/245 |
| 6,101,180 A | * | 8/2000 | Donahue et al. | 370/352 |
| 6,215,766 B1 | * | 4/2001 | Ammar et al. | 370/229 |
| 6,275,859 B1 | * | 8/2001 | Wesley et al. | 709/229 |
| 2002/0150094 A1 | * | 10/2002 | Cheng et al. | 370/389 |
| 2006/0146823 A1 | * | 7/2006 | Ding | 370/390 |

FOREIGN PATENT DOCUMENTS

| WO | WO 98/48343 | * 10/1998 |
|---|---|---|
| WO | WO 9848343 A | 10/1998 |

OTHER PUBLICATIONS

RFC 988 Host Extensions for IP Multicasting.*
D. Bolus et al, "Computer Protocols and Applications Using Satellite Networks: The Nadir Project", Journal of Telecommunication, Networks, US, Computer Science Press Inc., MD., vol. 3., No. 3, 1984, pp. 233-250 XP000809977.

(Continued)

*Primary Examiner*—Wing F Chan
*Assistant Examiner*—Brian Roberts
(74) *Attorney, Agent, or Firm*—Sughrue Mion, PLLC

(57) ABSTRACT

The invention relates to a telecommunications method in which multidestination information is transmitted from a terminal or from a server to a plurality of destinations using a protocol of the same type as the Internet Protocol (IP), and a control unit, such as a router, is provided to detect the presence of at least one destination. One destination or at most a limited number of destinations (72) is assigned a group representative function. That destination periodically sends a presence signal (62) to the control unit (54). The method can be used in a satellite telecommunications system. It requires less signaling than the IGMP.

15 Claims, 2 Drawing Sheets

OTHER PUBLICATIONS

Paul Sanjoy et al, "Reliable Multicast Transport Protocol (RMTP)", IEEE Journal on Selected Areas in Communications, IEEE Inc. NY, US, vol. 15, No. 3, Apr. 1, 1997, pp. 407-420, XP000683937.

Ralph Wittman et al, "Multicast Communication, Protocols and Applicatins", May 12, 2000, Morgan Kaufmann, San Francisco, CA XP002173748.

* cited by examiner

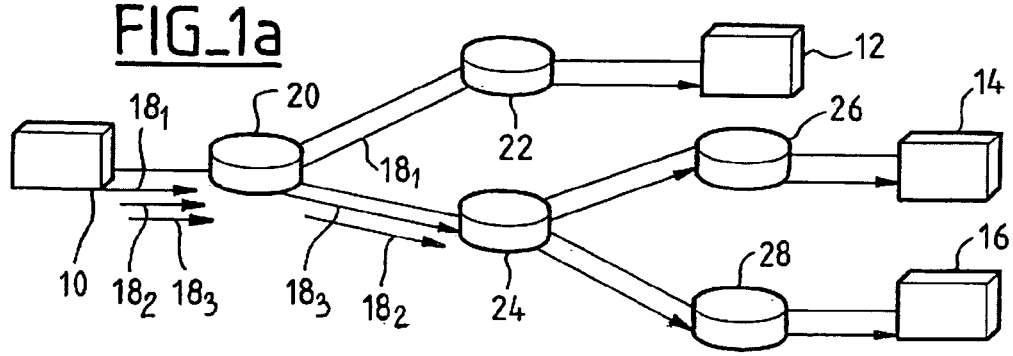
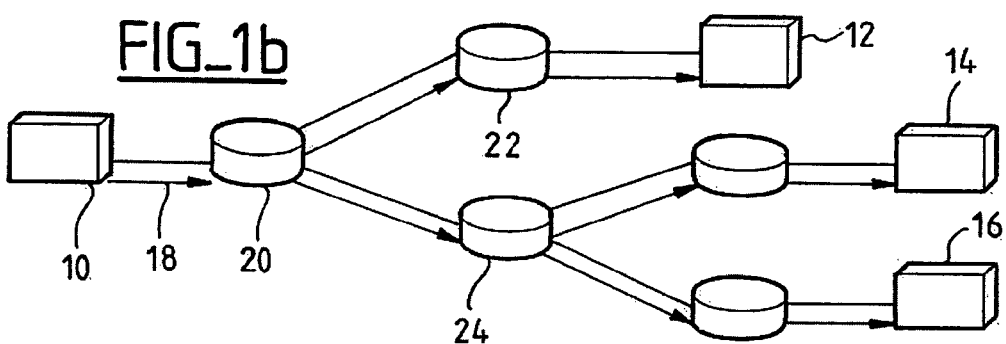
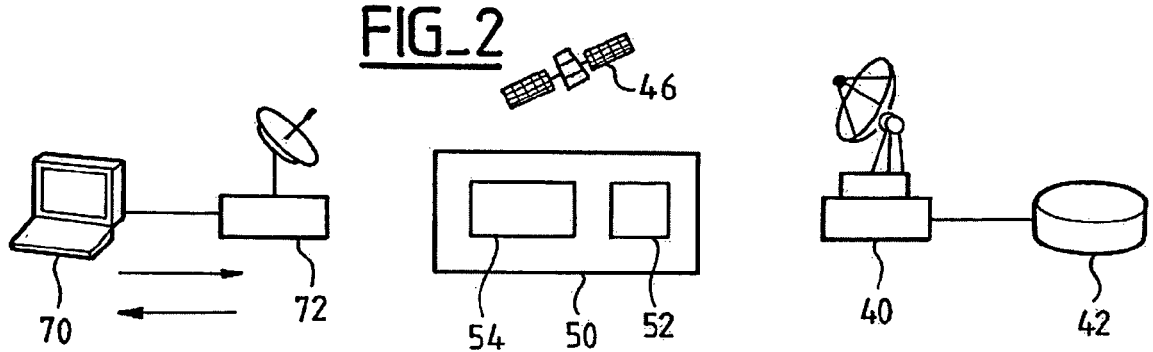
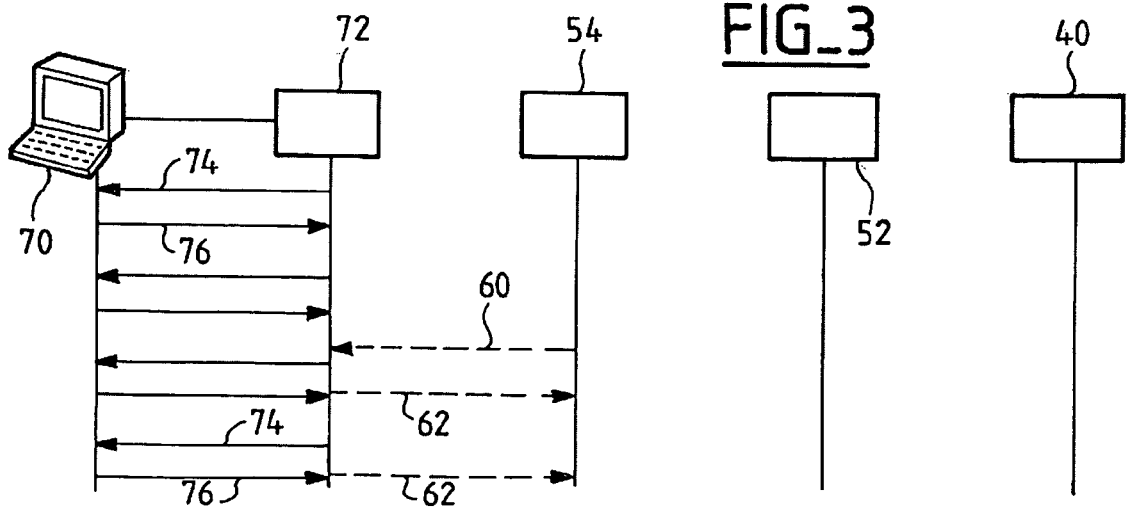

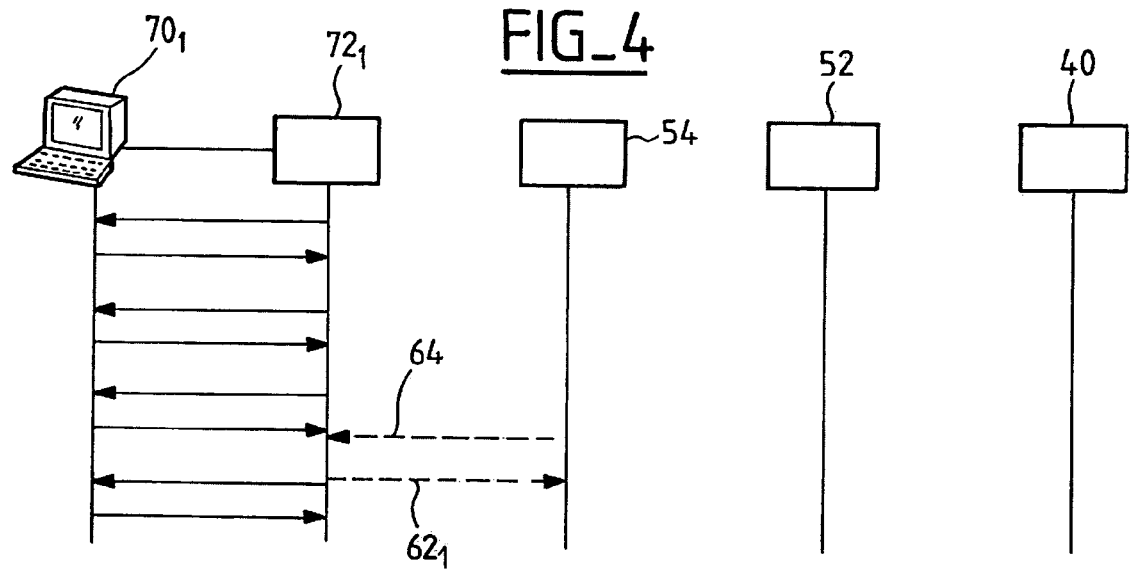
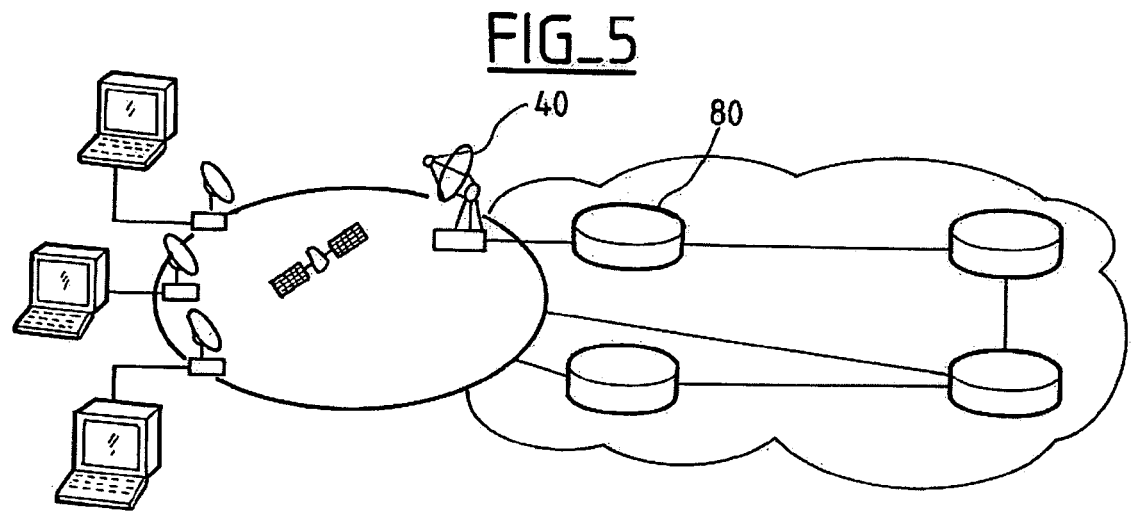
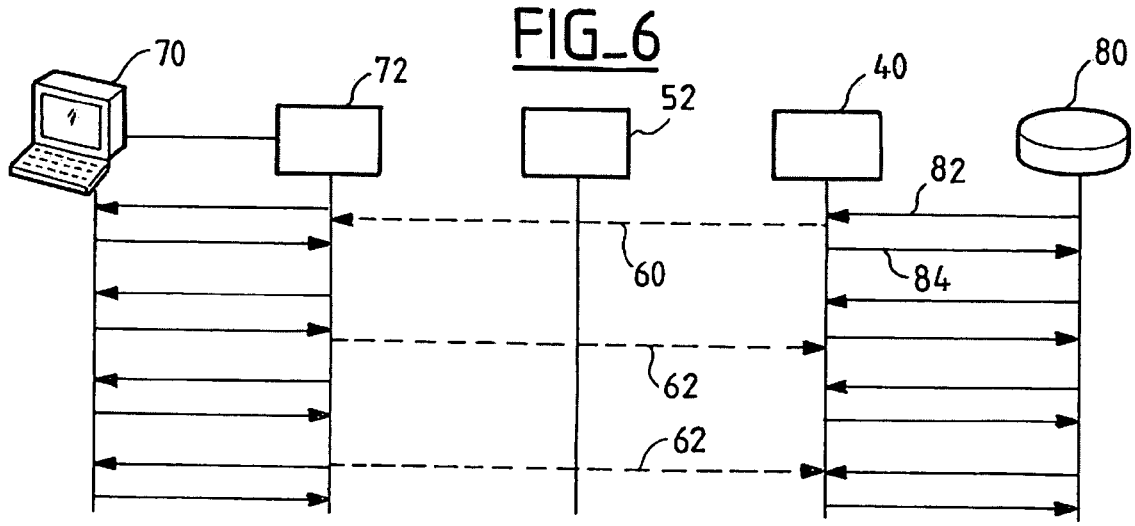

METHOD AND SYSTEM FOR BROADCASTING MULTICAST MESSAGES USING REPRESENTATIVES

The invention relates to a telecommunications method and system using a protocol of the same type as the Internet Protocol to broadcast multidestination messages.

Broadcasting information from one point to a plurality of points in a system like the Internet is becoming increasingly important, in particular for broadcasting television or radio programs and information of diverse kinds, such as stock market information or weather information. Point-to-multipoint links are also useful for video conferences and on-line commerce, such as on-line auctions.

To broadcast information to multiple destinations from a terminal or from a server, for example, the sender sends the multidestination information once only to the first node of the network and the information is transmitted once only on each channel from each node. This limits the load on the servers and on the network.

The benefit of this type of multidestination information broadcasting is apparent from FIGS. 1a and 1b, where FIG. 1a is a diagram of a network in which multidestination information is considered to constitute n single-destination information items, for n destinations, and where FIG. 1b is a diagram of a network in which multidestination information is processed collectively.

FIG. 1a shows that a server/sender 10 which must send the same information item to three server/receivers 12, 14 and 16 transmits three identical information items $18_1$, $18_2$ and $18_3$ that are routed individually by routers or by switching devices. Thus a first router 20 receives the three information items $18_1$, $18_2$, $18_3$ and transmits the information item $18_1$ to the first destination 12 via a second router 22. The first router 20 transmits the information items $18_2$ and $18_3$ to another router 24 which in turn transmits the information item $18_2$ to the terminal 14 via a router 26 and the information item $18_3$ to the terminal 16 via another router 28.

In the FIG. 1b diagram, the sender 10 transmits the information 18 to the router 20 with an indication of the destinations. The router 20 transmits the information to the router 22 and to the router 24. Thus it can be seen that this limits the traffic between the sender 10 and the router 20 and between the router 20 and the router 24, compared to the FIG. 1a diagram.

The remainder of the description refers only to the multidestination transmission method shown in FIG. 1b.

To limit signaling traffic in a point-to-multipoint transmission system, the Internet Group Management Protocol (IGMP) defined by the Internet Engineering Task Force (IETF) provides for a router to send periodically, for example every 30 seconds, a request to all the terminals that are connected to it directly, in order to determine if the terminals are in the multidestination group. On receiving the request, each terminal starts a random time-delay, at the end of which it sends a response. The maximum time-delay is 20 milliseconds, for example. When one terminal has sent a response, the response is detected by the other terminals and the detection of the response inhibits the sending of responses by the other terminals. Thus with this standardized method, signaling traffic consists of a periodic request sent by a router and a single or a limited number of responses sent to the router. The only information that the router or the control unit requires is whether multidestination broadcasting is still necessary, i.e. whether there is at least one terminal that still constitutes a destination.

The invention stems from the observation that the above standard, which limits signaling traffic in multidestination broadcasting, cannot be applied to a satellite telecommunications system. This is because the time-delays are too short and the response of one terminal to a request usually cannot be detected by the other terminals.

Thus each terminal responds to the request from the router and there can therefore be a considerable amount of signaling traffic. For example, if a satellite telecommunications system provides 5000 multidestination groups each comprising 2000 destinations, the system will be loaded with ten million responses, i.e. ten million packets each of 55 bytes, during each interrogation period, i.e. approximately every 30 seconds. This overload is reflected in an additional bit rate of around 70 Megabit/s. What is more, the traffic is concentrated into a few tens of milliseconds.

To solve this problem, the invention provides a multidestination group control unit and a telecommunications terminal representative of each group is selected and periodically sends to the group control unit a presence signal constituting an indication of its status as a member of the group.

Signaling traffic is therefore limited to a single response, as in a system which detects responses from other terminals.

The telecommunications terminal preferably sends a departure message when it leaves the multidestination group so that the control unit can designate another telecommunications terminal as the representative of the group.

The representative telecommunications terminal is the terminal whose subscription or connection to the group is the longest standing, for example.

To limit signaling further, in one implementation, embodiment the periodic sending by the representative telecommunications terminal of a presence signal to the control unit is effected without the control unit sending any request.

Moreover, and again to limit signaling, the frequency at which the presence signals are sent is preferably relatively low, and lower than the frequency of requests specified in the IETF standard. The period between two sendings of presence signals is greater than one minute, for example.

If the telecommunications system is a multibeam system, i.e. when a satellite covers a plurality of separate terrestrial areas, and if multidestination broadcasting covers a plurality of areas, it is necessary to provide at least one representative telecommunications terminal for each area.

Thus the invention provides a telecommunications method in which multidestination information is transmitted from a terminal or from a server to a plurality of destinations using a protocol of the same type as the Internet Protocol (IP), and a control unit, such as a router, is provided to detect the presence of at least one destination, in which method one destination or at most a limited number of destinations is assigned a group representative function and periodically sends a presence signal to the control unit.

In one implementation, the control unit assigns the representative function to a destination.

Another destination is preferably appointed as the multidestination group representative if the control unit has not detected a presence signal at the end of a predetermined time.

In one implementation, the control unit stops the sending of multidestination information when it notes the absence of reception of a presence signal after the control unit sends a request signal.

The group representative destination can spontaneously send presence signals with a particular periodicity, for example of the order of one minute, without receiving a request signal.

In this case, the frequency at which presence signals are sent is preferably lower than the frequency for sending requests specified in the IGMP standard.

In one implementation, each destination has a telecommunications terminal for the connection to the telecommunications network and at least one user terminal and the telecommunications terminal and the user terminal(s) communicate in accordance with the IGMP.

In this method, communication is advantageously effected via a satellite transmission system. In this case, if the satellite transmits a plurality of beams, at least one destination in each beam represents a group.

In this method, communication can also effected by a satellite transmission system which includes a central control station and in which the Earth is divided into areas, each area includes a connection station for connecting the terminals of the area concerned to other telecommunications networks, and the control unit is in the central control station of the system or in a connection station.

The invention also provides a destination telecommunications terminal of a telecommunications system using the Internet Protocol, which terminal is adapted to receive multidestination information and is characterized in that it includes means for receiving a delegation signal assigning it a function of representing a destination group for the multidestination and information means for sending presence signals when it is thus appointed as group representative.

The terminal preferably includes means for sending the presence signals periodically.

In this case, the frequency for sending presence signals is advantageously lower than the frequency for sending request signals specified in the IGMP.

One embodiment of the terminal includes means for sending a presence signal on receiving a request signal if said terminal is not the group representative, but is a member of the multidestination group.

The terminal is preferably adapted to receive signals via a telecommunications satellite.

Other features and advantages of the invention become apparent in the course of the following description of embodiments of the invention, which description is given with reference to the appended drawings, in which:

FIGS. 1a and 1b, already described, show a telecommunications network,

FIG. 2 is a diagram of a telecommunications network to which the invention applies, FIG. 3 is a diagram showing a method of the invention, FIG. 4 is a diagram analogous to the FIG. 3 diagram and showing another aspect of a method of the invention, FIG. 5 is a diagram of another telecommunications network to which the invention applies, and FIG. 6 is a diagram analogous to the FIGS. 3 and 4 diagrams and showing the method of the invention applied to the FIG. 5 telecommunications system.

The telecommunications system described here by way of example uses single-beam or multibeam geostationary satellites. In a multibeam system of this kind, the Earth is divided into areas (not shown) and each area is assigned a base station 40 (FIG. 2) communicating with other networks and with the other base stations of the other areas via a router 42 connected to the station 40 (FIG. 2).

In any area, each user terminal communicates with the network or with another terminal in the same area via equipment onboard a satellite 46. Thus a message sent by a user terminal is sent to the satellite 46, which forwards it to the base station 40, which forwards the message to another terminal (not shown) via equipment onboard the satellite 46.

This telecommunications system includes a network control center 50 with a control station 52. The invention consists in providing a multidestination group control unit 54, which is installed in the satellite network control center 50 if the operator is also an Internet service provider, for example. In the invention, the function of the multidestination group control unit 54 is to designate (arrow 60, FIG. 3) a telecommunications terminal 72 forming part of a group in order for the latter to represent the group. The control unit continues to send multidestination information for as long as one telecommunications terminal continues to send a presence signal manifesting its membership of the multidestination group.

To this end, the telecommunications terminal 72 periodically sends presence signals (reports) 62 to the control unit 54 without receiving a request signal 64 (FIG. 4) from the unit 54. Where applicable, the presence signals 60 and 62 and the request signal 64 (FIG. 4), are transmitted via equipment onboard the satellite 46, of course.

Another terminal $72_1$ (FIG. 4) that is part of the same group, i.e. intended to receive the multidestination information, does not send a presence signal spontaneously. However, it does send a presence signal $62_1$ if it receives a request 64 from the control unit 54. A request signal 64 is sent when the control unit 54 finds that it is no longer receiving presence signals 62 from the delegated terminal 72, in which case it must appoint another delegate. If the control unit 54 receives a presence signal $62_1$, it chooses as the delegate one of the terminals that sent the presence signal $62_1$. Otherwise, i.e. if the unit 54 does not receive a presence signal $62_1$ indicating that a terminal belongs to a multidestination group, the unit commands the interruption of the sending of multidestination signals.

Note that the conventional method of the IGMP standard cannot work in this kind of satellite telecommunications system because the terminals cannot detect the presence signals 62 sent by the other terminals in time, or even at all. In the IGMP, the presence signal is sent in response to a request from a control unit and with a random time-delay, and when a presence signal has been sent by one terminal all the other terminals detect it, interrupt the time-delay and send no presence signal.

The problem with using the IGMP in a satellite telecommunications system stems from the fact that, according to the standard, the maximum time-delay between receiving a request and sending a presence signal is 20 milliseconds. Because of the signal propagation times in a satellite transmission system, this time-delay is too short for a presence signal to be received. Moreover, the directional nature of the sending by each terminal, and the coding or modulation of the signal sent by each terminal are such that they cannot be received by other terminals without modification.

As described below, one or more terminals 70 using the protocol of the IGMP standard is or are associated with the telecommunications terminals 72, $72_1$ for receiving delegation signals 60 and sending presence signals 62.

The telecommunications terminal 72 connects a plurality of user terminals to the network. Because the telecommunications terminal 72 and the user terminal 70 both use the IGMP, the terminal 72 and the user terminal 70 communicate using this protocol, the telecommunications terminal periodically sending requests 74 and the user terminal 70 sending a response in the form of a presence signal 76 after a random time-delay. This local protocol is used when a plurality of user terminals are connected to the terminal 72.

When the telecommunications system includes a plurality of areas corresponding to different satellite beams, a delegate telecommunications terminal of the multidestination group is provided for each beam.

When a single user terminal is associated with the telecommunications terminal, as in a mobile telecommunications system, the telecommunications terminal and the user terminal are one and the same.

As indicated above, the example described with reference to FIGS. 2 to 4 is suited to a situation in which a satellite telecommunications network operator is also an Internet service provider, so that the group control unit 54 can be accommodated in the central station 50. In the example described next with reference to FIGS. 5 and 6, the satellite telecommunications system operator is not an Internet service provider, and the ISP is external to the telecommunications system. Accordingly, as shown in FIG. 5, the Internet service provider 80 is connected to a base station 40 of a satellite telecommunications system. In this situation, the control unit is in the connection station 40.

The method is the same as that described with reference to FIGS. 2 to 4. The delegation signal 60 is transmitted from the control unit installed in the connection station 40 to the delegated telecommunications terminal 72 and the delegated terminal sends periodic presence signals 62.

The connection between the station 40 and the station 80 of the Internet service provider is a conventional one using the protocol of the IGMP standard, with periodic requests 82 sent from the station 80 to the station 40 and reports, or presence signals, sent from the station 40 to the station 80.

Comparing the spacing between the arrows 62 and between the arrows 74 in FIGS. 3 and 6 show that the frequency of sending the signal 62 is lower than the frequency of sending requests in the IGMP.

For a conventional telecommunications system with 5000 multidestination groups each with 2000 members, the signaling load on the "return" channel, i.e. from the terminals to the control unit, is approximately 70 Mbit/s. With the invention, and all other things being equal, the signaling load is divided by a factor of 2000, since only one telecommunications terminal of the 2000 in each group sends a presence signal. This reduces the signaling load to 35 kbit/s and the signaling load can be reduced further if, as described in the examples, the frequency of sending the presence signal 62 is lower than the frequency specified in the IGMP.

If the telecommunications system is a multibeam system, for example one with 60 beams, the load must nevertheless be multiplied by the number of beams. However, in this situation the signaling load nevertheless remains very much lower than it would be without using the invention.

The invention is not limited to a telecommunications method and system. It relates also to the various components of the system, in particular the terminals and the control units.

The invention claimed is:

1. A telecommunications method comprising:
transmitting multidestination information from a terminal or from a server to a destination group comprising a plurality of destinations using the Internet Group Management Protocol defined by the Internet Engineering Task Force, wherein said transmission is effected in accordance with the Internet Protocol; and
detecting, by a control unit, the presence of at least one destination of said plurality of destinations;
wherein at least one but less than all of said plurality of destinations is assigned a group representative function and periodically sends a presence signal to the control unit.

2. A method according to claim 1, wherein the control unit assigns the representative function to a destination 3. A method according to claim 1, wherein another destination is appointed as the multidestination group representative if the control unit has not detected a presence signal at the end of a predetermined time.

4. A method according to claim 1, wherein the control unit stops the sending of multidestination information when it notes the absence of reception of a presence signal after it sends a request signal.

5. A method according to claim 1, wherein the group representative destination spontaneously sends presence signals with a particular periodicity without receiving a request signal.

6. A method according to claim 5, wherein the frequency at which presence signals are sent is lower than the frequency for sending requests specified in the IGMP standard.

7. A method according to claim 1, wherein each destination has a telecommunications terminal for the connection to the telecommunications network and at least one user terminal and the telecommunications terminal and the user terminal(s) communicate in accordance with the IGMP.

8. A method according to claim 1, wherein said transmission from a terminal or from a server to a plurality of destinations is effected via a satellite transmission system.

9. A method according to claim 8, wherein a satellite transmits a plurality of beams and at least one destination in each beam represents a group.

10. A method according to claim 8, wherein said transmission from a terminal or from a server to a plurality of destinations is effected via a satellite transmission system which includes a central control station and in which the Earth is divided into areas, each area includes a connection station for connecting the terminals of the area concerned to other telecommunications networks, and the control unit is in the central control station of the system or in a connection station.

11. A destination telecommunications terminal of a telecommunications system using the Internet Protocol, which terminal is adapted to receive multidestination information and wherein said terminal comprises:
means for receiving a delegation signal assigning said terminal a function of representing a destination group that comprises a plurality of destination telecommunications terminals for the multidestination information; and
means for sending presence signals when said terminal is thus appointed as group representative.

12. A terminal according to claim 11, further comprising means for sending the presence signals periodically.

13. A terminal according to claim 12, wherein the frequency for sending presence signals is lower than the frequency for sending request signals specified in the IGMP.

14. A terminal according to claim 11, further comprising means for sending a presence signal on receiving a request signal if said terminal is not the multidestination group representative but is a member of the group.

15. A terminal according to claim 11, wherein said terminal is adapted to receive signals via a telecommunications satellite.

* * * * *